(12) United States Patent
Suzuki et al.

(10) Patent No.: US 11,477,460 B2
(45) Date of Patent: Oct. 18, 2022

(54) IMAGE PROCESSING APPARATUS, LEARNING APPRATUS, IMAGE PROCESSING METHOD, LEARNING METHOD AND PROGRAM

(71) Applicant: NIPPON TELEGRAPH AND TELEPHONE CORPORATION, Tokyo (JP)

(72) Inventors: Satoshi Suzuki, Musashino (JP); Motohiro Takagi, Musashino (JP); Kazuya Hayase, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/298,221

(22) PCT Filed: Dec. 3, 2019

(86) PCT No.: PCT/JP2019/047240
§ 371 (c)(1),
(2) Date: May 28, 2021

(87) PCT Pub. No.: WO2020/116451
PCT Pub. Date: Jun. 11, 2020

(65) Prior Publication Data
US 2022/0094943 A1    Mar. 24, 2022

(30) Foreign Application Priority Data
Dec. 5, 2018 (JP) .............................. JP2018-228402

(51) Int. Cl.
H04N 19/154 (2014.01)
H04N 19/136 (2014.01)
H04N 19/85 (2014.01)

(52) U.S. Cl.
CPC ......... *H04N 19/154* (2014.11); *H04N 19/136* (2014.11); *H04N 19/85* (2014.11)

(58) Field of Classification Search
CPC ..... H04N 19/154; H04N 19/136; H04N 19/85
USPC .................................................. 375/240.02
See application file for complete search history.

(56) References Cited

FOREIGN PATENT DOCUMENTS

| JP | 2017130089 A | 7/2017 |
|----|--------------|--------|
| JP | 2018128265 A | 8/2018 |

OTHER PUBLICATIONS

Hyomin Choi and Ivan V. Bajic, Near-Lossless Deep Feature Compression for Collaborative Intelligence, 2018 IEEE 20th International Workshop on Multimedia Signal Processing(MMSP), Aug. 29, 2018.

Christian Szegedy et al., Intriguing properties of neural networks, International Conference on Learning Representations (2014), Feb. 19, 2014, pp. 1-10.

(Continued)

*Primary Examiner* — On S Mung

(57) ABSTRACT

An image processing device includes an image processing unit configured to execute image processing on an image based on an input image and output a result of the image processing, the input image is a post-conversion image obtained by performing image conversion on an original image, and the conversion includes image conversion for further decreasing a data size of the original image while maintaining a feature quantity used in the image processing and processing accuracy of the image processing.

5 Claims, 11 Drawing Sheets

(56) References Cited

OTHER PUBLICATIONS

Samuel Dodge and Lina Karam, Understanding How Image Quality Affects Deep Neural Networks, 2016 Eighth International Conference on Quality of Multimedia Experience (QoMEX), Jun. 6, 2016.
Hyomin Choi and Ivan V. Bajic, High Efficiency Compression for Object Detection, 2018 IEEE International Conference on Acoustics, Speech and Signal Processing (ICASSP), Apr. 15, 2018.
Eloise Vidal et al., JND-Guided Perceptual Pre-filtering for HEVC Compression of UHDTV Video Contents, International Conference on Advanced Concepts for Intelligent Vision Systems, ACIVS2017, LNCS 10617, Sep. 18, 2017, pp. 375-385.

IMAGE PROCESSING APPARATUS, LEARNING APPRATUS, IMAGE PROCESSING METHOD, LEARNING METHOD AND PROGRAM

CROSS-REFERENCE TO RELATED APPLICATIONS

This application is a 371 U.S. National Phase of International Application No. PCT/JP2019/047240 filed on Dec. 3, 2019, which claims priority to Japanese Application No. 2018-228402 filed on Dec. 5, 2018. The entire disclosures of the above applications are incorporated herein by reference.

TECHNICAL FIELD

The present invention relates to an image processing device, a learning device, an image processing method, a learning method, and a program.

BACKGROUND ART

In recent years, for example, the processing accuracy of image processing using machine learning for detection or identification of a subject in an image, division of the image into regions, and the like has improved remarkably. An image processing technology using such machine learning has been attracting attention as a technology for automating visual inspection processes in various businesses. In such image processing, for example, when an imaging device for capturing a processing target image is present in an environment in which the imaging device communicates with an edge server in a communication network and a server responsible for automation of a visual inspection process is present in a cloud environment that is present at a position physically remote from the imaging device, the captured image is transmitted to the cloud server via the edge server. In this case, it is required to reduce a code amount at the time of transmission while maintaining image processing accuracy.

Image encoding schemes for reducing the code amount at the time of transmission while maintaining the image processing accuracy are roughly classified into two types of schemes including schemes for transmitting an image itself and schemes for transmitting information indicating features extracted from an image. Examples of the former type of scheme for transmitting an image itself include a general image encoding scheme such as H.265/high efficiency video coding (HEVC). On the other hand, examples of the latter type of scheme for transmitting information indicating features extracted from the image include a scheme called collaborative intelligence for transmitting a feature map that is an output of an intermediate layer of a neural network (for example: Non Patent Literature 1). The latter type of scheme is efficient in terms of power consumption or calculation time, but does not easily restore an original image from a feature quantity, for example, particularly when a hierarchy of the neural network that extracts the feature map is deep (See Non Patent Literature 1).

Further, it is difficult to automate all visual inspection processes in various businesses using an image processing system. Thus, a flow of the entire visual inspection process is assumed to be a process in which primary screening is first performed by utilizing an image processing system and then secondary screening is performed through direct visual inspection of humans. Thus, it is preferable for a scheme for allowing a person to directly visually inspect a processing target image to be used as an image encoding scheme for automating the visual inspection process.

Incidentally, for example, in general image encoding schemes such as H.265/HEVC, the image processing accuracy is not used as an evaluation index, but objective image quality and subjective image quality are mainly used as evaluation indexes. Thus, it can be said that the general image encoding schemes are schemes of which a main object is to maintain image quality. Thus, in the general image encoding schemes, a process of actively thinning high frequency components that are difficult for humans to perceive is performed in order to maintain the image quality in a low code amount band, and signals in a low frequency area are held preferentially. Thus, in such general image encoding schemes, the image processing accuracy may be degraded in a case in which the image processing is performed on a decoded image among cases in which image processing is performed on an original image and is performed on the decoded image.

Further, Non Patent Literature 2 shows that, when a perturbation that humans can hardly distinguish is imparted to an image, the processing accuracy of image processing in a convolutional neural network may be greatly degraded. That is, it can be said that the signal maintaining the image quality and the signal maintaining the image processing accuracy do not always match. Further, Non Patent Literature 3, which describes a relationship between a code amount and image identification accuracy in the Joint Photographic Experts Group (JPEG) and the JPEG2000, shows that the image identification accuracy in a low code amount band is much lower than that in a high code amount band. Considering these points, it can be said that the general image encoding scheme is insufficient as a scheme for maintaining the image processing accuracy.

Examples of a prior art in which an image encoding scheme is examined from the viewpoint of maintaining image processing accuracy include a technology described in Non Patent Literature 4. In the technology described in Non Patent Literature 4, an importance map in an image is generated from reaction of a feature map of a convolutional neural network and a code amount is mainly assigned to an important image area such that rate control based on image processing accuracy can be performed. However, in the technology described in Non Patent Literature 4, the rate control is performed by HM that is H.265/HEVC reference software, and quantization parameters (QP) obtained there are corrected in a range of ±2 to 3. Thus, it can be said that significant reduction in coding efficiency cannot be expected. Further, the technology described in Non Patent Literature 4 is not assumed to be applied to an encoding scheme such as JPEG in which a quantization parameter cannot be changed in an image. Thus, it is difficult for the technology described in Non Patent Literature 4 to be applied to an encoding system that does not include an adaptive quantization mechanism.

Further, because an imaging device that captures an image does not necessarily include an encoding system including an adaptive quantization mechanism, it is preferable for an image encoding scheme that does not depend on an encoding scheme in a subsequent stage to be used. Because JPEG has a mechanism for storing a quantization table in a header, strictly speaking, it is also possible to introduce an adaptive quantization mechanism into JPEG.

However, because it is assumed that a total code amount will increase due to an increase in calculation amount and an increase in a size of the header when the quantization table is assigned to each encoded block, it can be said that it is not realistic to introduce the adaptive quantization mechanism into JPEG.

Examples of an image encoding scheme capable of greatly reducing a code amount without depending on an encoding scheme in a subsequent stage include a scheme called an image pre-filter (pre-conversion) (for example: Non Patent Literature 5). A pre-filter scheme smooths a part or all of an image before an encoding process to reduce a code amount of the image.

Further, Non Patent Literature 5 describes an image encoding scheme for calculating an area in which it is difficult for humans to perceive a change on the basis of characteristics of human perception and determining a smoothing strength. In general, when an image is smoothed, high frequency components are reduced, and a prediction residual is reduced in a predictive encoding scheme.

Thus, with the smoothing in the pre-filter scheme, it is possible to convert an image to a state in which a code amount is small without depending on an image encoding scheme. In fact, Non Patent Literature 5 shows the effectiveness of reduction in code amount of an image using the pre-filter even in H.264/advanced video coding (AVC), in addition to H.265/HEVC. However, the image encoding scheme described in Non Patent Literature 5 is based on characteristics of human perception and is not a scheme considering image processing accuracy.

CITATION LIST

Non Patent Literature

Non Patent Literature 1: H. Choi, I. V. Bajic, "Near-Lossless Deep Feature Compression for Collaborative Intelligence," arXiv, 15 Jun. 2018.
Non Patent Literature 2: C. Szegedy, W. Zaremba, I. Sutskever, J. Bruna, D. Erhan, I. Goodfellow, R. Fergus, "Intriguing properties of neural networks," arXiv, 19 Feb. 2014.
Non Patent Literature 3: S. Dodge, L. Karam, "Understanding How Image Quality Affects Deep Neural Networks," arXiv, 21 Apr. 2016.
Non Patent Literature 4: H. Choi, I. V. Bajic, "High Efficiency Compression for Object Detection," arXiv, 16 Feb. 2018.
Non Patent Literature 5: E. Vidal, F. X. Caudoux, P. Corlay, C. Guillemot, "JND-Guided Perceptual Pre-filtering for HEVC Compression of UHDTV Video Content," International Convention on Advanced Concepts for Intelligent Vision Systems, ACIVS2017, LNCS 10617, pp. 375-385, 2017.

SUMMARY OF THE INVENTION

Technical Problem

In view of the background art described above, an image conversion technology for performing conversion to an image with a low code amount while maintaining image processing accuracy, and also maintaining the inspection accuracy of a visual inspection of humans (hereinafter referred to as "visual accuracy") has been required. Among image conversions, particularly, a scheme for smoothing image components, which is widely known for an effect of reduction in a code amount, is considered to be promising. Further, when image components are uniformly smoothed, image processing accuracy is degraded (Non Patent Literature 3), but when only areas that are not important in image processing are smoothed, it is expected that degradation of the processing accuracy will not occur. However, in the case of the pre-filter scheme considering the image processing accuracy, it is unclear what kind of feature quantity is emphasized in image processing. That is, it can be said that it is unclear which area in the image may be converted to an image to be smoothed. Thus, the pre-filter scheme has a problem that it is difficult to design a filter on the basis of physiological knowledge such as characteristics of human perception.

On the other hand, a scheme for smoothing an image component by utilizing the generated importance map can also be considered, as in the technology described in Non Patent Literature 4. However, in the case of this scheme, it is still unclear to what degree a smoothing process may be performed using the importance map in the first place in order to perform image conversion that does not affect the image processing accuracy.

Further, the importance map generated in the technology described in Non Patent Literature 4 is only generated according to an output strength of an intermediate layer of a convolutional neural network (CNN). Thus, the map does not show a truly important area because the smoothing process does not affect the image processing accuracy even when the smoothing process is performed. In general, the code amount of the image is reduced due to the fact that, when the smoothing process is performed on the image, high-frequency components are reduced and the prediction residual is small in an image encoding scheme including a prediction mechanism, as described above. However, when a smoothing process is uniformly performed on the entire image using a Gaussian filter or the like, the image processing accuracy is greatly degraded.

The present invention has been made in view of the technical background as described above, and an object of the present invention is to provide an image conversion technology for reducing a code amount while maintaining image processing accuracy, and also maintaining human visual accuracy.

Means for Solving the Problem

An aspect of the present invention is an image processing device including an image processing unit configured to execute image processing on an image based on an input image and output a result of the image processing, wherein the input image is a post-conversion image obtained by performing image conversion on an original image, and the image conversion includes image conversion for further decreasing a data size of the original image while maintaining a feature quantity used in the image processing and maintaining processing accuracy of the image processing.

Further, an aspect of the present invention is the image processing device, wherein the image conversion further includes image conversion for maintaining visual accuracy between the original image and the post-conversion image.

Further, an aspect of the present invention is the image processing device further including: an image correction unit configured to correct contrast of the image based on the input image using a predetermined correction coefficient to obtain a corrected image, wherein the image processing unit executes the image processing on the corrected image.

Further, an aspect of the present invention is a learning device including a learning unit configured to perform machine learning using a training image indicating an image for learning and information indicating a result of image conversion for the training image to acquire a learning result for obtaining a post-conversion image subjected to image conversion so that a predetermined condition is satisfied for an original image, wherein the predetermined condition includes a condition for further decreasing a data size of the original image while maintaining a feature quantity used in image processing and maintaining processing accuracy of the image processing.

Further, an aspect of the present invention is the learning device, wherein the predetermined condition further includes a condition that visual accuracy between the original image and the post-conversion image is maintained.

Further, an aspect of the present invention is an image processing method including executing image processing on an image based on an input image and outputting a result of the image processing, wherein the input image is a post-conversion image obtained by performing image conversion on an original image, and the image conversion includes image conversion for further decreasing a data size of the original image while maintaining a feature used in the image processing and maintaining processing accuracy of the image processing.

Further, an aspect of the present invention is a learning method including performing machine learning using a training image indicating an image for learning and information indicating a result of image conversion for the training image to acquire a learning result for obtaining a post-conversion image subjected to image conversion so that a predetermined condition is satisfied for an original image, wherein the predetermined condition includes a condition for further decreasing a data size of the original image while maintaining a feature quantity used in image processing and maintaining processing accuracy of the image processing.

Further, an aspect of the present invention is a program for causing a computer to function as the above image processing device.

Effects of the Invention

With the present invention, it is possible to reduce a code amount while maintaining the image processing accuracy.

DESCRIPTION OF EMBODIMENTS

First Embodiment

Hereinafter, a first embodiment of the present invention will be described with reference to the drawings.

Configuration of Image Processing Device

Figure 1:
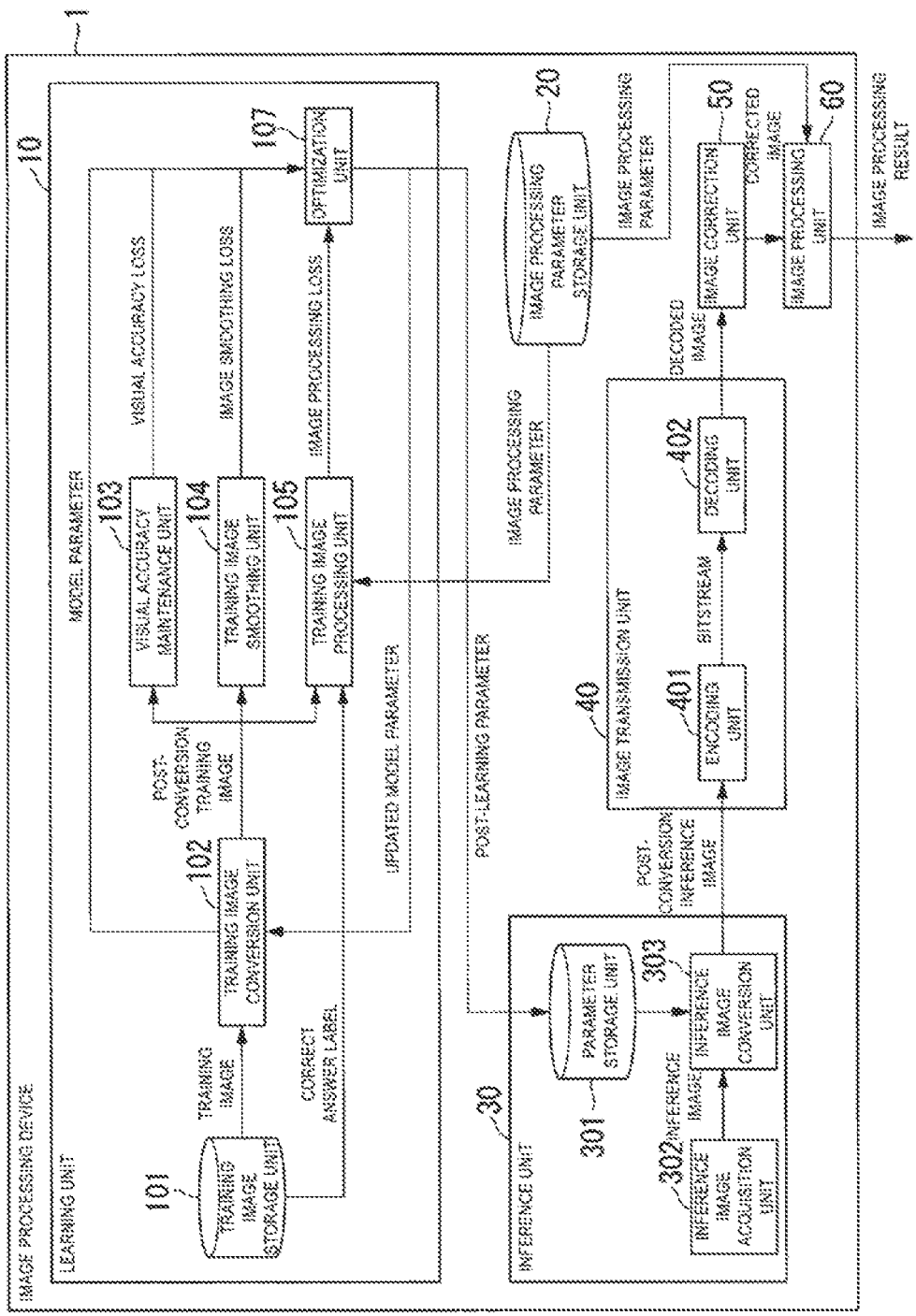
FIG. 1 is a block diagram illustrating a functional configuration of an image processing device 1 according to a first embodiment of the present invention.

Hereinafter, a functional configuration of an image processing device 1 will be described. FIG. 1 is a block diagram illustrating a functional configuration of an image processing device 1 according to a first embodiment of the present invention. As illustrated in FIG. 1, the image processing device 1 includes a learning unit 10, an image processing parameter storage unit 20, an inference unit 30, an image transmission unit 40, an image correction unit 50, and an image processing unit 60.

A trained model subjected to machine learning (hereinafter referred to as "learning") by the learning unit 10 is used by the inference unit 30 in a subsequent stage. Thus, there is a time difference between a timing at which the learning unit 10 performs a process and a timing at which functional units subsequent to the inference unit 30 in the subsequent stage perform a process.

First, the learning unit 10 will be described. The learning unit 10 includes a training image storage unit 101, a training image conversion unit 102, a visual accuracy maintenance unit 103, a training image smoothing unit 104, a training image processing unit 105, and an optimization unit 107, as illustrated in FIG. 1.

The training image storage unit 101 stores an image for learning (hereinafter referred to as a "training image") and correct answer data in image processing (hereinafter referred to as a "correct answer label") in advance. The training image storage unit 101 is realized by, for example, a storage medium such as a flash memory, a hard disk drive (HDD), a solid state drive (SDD), a random access memory (RAM; a readable and writable memory), an electrically erasable programmable read only memory (EEPROM), or a read only memory (ROM), or a combination of these storage media.

The training image conversion unit 102 acquires a training image from the training image storage unit 101. Further, the training image conversion unit 102 acquires a model parameter updated by the optimization unit 107 (hereinafter referred to as an "updated model parameter") from the optimization unit 107. The training image conversion unit 102 performs image conversion on the acquired training image on the basis of the acquired updated model parameter. The training image conversion unit 102 outputs the training image subjected to image conversion (hereinafter referred to as a "post-conversion training image") to the visual accuracy maintenance unit 103, the training image smoothing unit 104, and the training image processing unit 105. Further, the training image conversion unit 102 outputs the model parameter used for the image conversion to the optimization unit 107.

The visual accuracy maintenance unit 103 acquires the post-conversion training image output from the training image conversion unit 102. The visual accuracy maintenance unit 103 evaluates visual accuracy, which is inspection accuracy of visual inspection of humans, with respect to the acquired post-conversion training image, and calculates a visual accuracy loss for increasing the visual accuracy. The visual accuracy maintenance unit 103 outputs the calculated visual accuracy loss to the optimization unit 107.

The training image smoothing unit 104 acquires the post-conversion training image output from the training image conversion unit 102. The training image smoothing unit 104 evaluates a degree of smoothing of the image with respect to the acquired post-conversion training image and calculates an image smoothing loss for increasing the degree of smoothing. The training image smoothing unit 104 outputs the calculated image smoothing loss to the optimization unit 107. The training image smoothing unit 104 may calculate an image smoothing loss for decreasing the degree of smoothing depending on a distance between an image processing result and the correct answer label, for example.

The training image processing unit 105 acquires the correct answer label from the training image storage unit 101. Further, the training image processing unit 105 acquires a parameter of an image processing model (hereinafter referred to as an "image processing parameter") from the image processing parameter storage unit 20. Further, the training image processing unit 105 acquires the post-conversion training image output from the training image conversion unit 102. The training image processing unit 105 performs image processing on the acquired post-conversion training image to calculate an image processing loss for minimizing a difference from the correct answer label. The training image processing unit 105 propagates the calculated image processing loss to an input unit of the image processing model and outputs the image processing loss to the optimization unit 107. The term "propagate" refers to a process of calculating an error gradient at a desired position in an image conversion model according to an error gradient calculation algorithm such as an error back propagation method.

The optimization unit 107 acquires the visual accuracy loss output from the visual accuracy maintenance unit 103. Further, the optimization unit 107 acquires the image smoothing loss output from the training image smoothing unit 104. Further, the optimization unit 107 acquires the image processing loss output from the training image processing unit 105. Further, the optimization unit 107 acquires the model parameter output from the training image conversion unit 102. The optimization unit 107 updates the acquired model parameter to optimize the model parameter on the basis of the acquired visual accuracy loss, the image smoothing loss, and the image processing loss. That is, the optimization unit 107 updates the model parameter so that the distance between the image processing result and the correct answer label is shortened as much as possible while increasing the visual accuracy and the degree of image smoothing as much as possible.

When the learning is continued, the optimization unit 107 outputs the updated model parameter (hereinafter referred to as an "updated model parameter") to the training image conversion unit 102. On the other hand, when the learning ends, the optimization unit 107 stores the updated model parameter (hereinafter referred to as a "post-learning parameter") in the parameter storage unit 301.

The training image conversion unit 102 does not perform image conversion on the entire original image, but may perform image conversion on only a desired target range in which the visual inspection is desired to be performed, and each loss (particularly, a visual accuracy loss) may be calculated from a post-conversion training image corresponding to the range.

Next, a configuration of functional units other than the learning unit will be described. The image processing parameter storage unit 20 stores the image processing parameter that is a parameter for image processing in advance. The image processing parameter storage unit 20 is realized by, for example, a storage medium such as a flash memory, an HDD, an SDD, a RAM, an EEPROM, a register, or a ROM, or a combination of these storage media.

The inference unit 30 includes a parameter storage unit 301, an inference image acquisition unit 302, and an inference image conversion unit 303, as illustrated in FIG. 1.

The parameter storage unit 301 stores the post-learning parameter output from the optimization unit 107. The parameter storage unit 301 is realized by a storage medium such as a flash memory, an HDD, an SDD, a RAM, an EEPROM, or a register, or a combination of these storage media, for example.

The inference image acquisition unit 302 acquires an image serving as an image processing target (hereinafter referred to as an "inference image") from, for example, an external imaging device or a storage medium. The inference image acquisition unit 302 may have a function of an imaging device. The inference image acquisition unit 302 outputs the acquired inference image to the inference image conversion unit 303.

The inference image conversion unit 303 acquires the inference image output from the inference image acquisition unit 302.

Further, the inference image conversion unit 303 acquires the post-learning parameter from the parameter storage unit 301. The inference image conversion unit 303 performs image conversion on the acquired inference image on the basis of the acquired post-learning parameter. The inference image conversion unit 303 outputs the inference image subjected to image conversion (hereinafter referred to as a "post-conversion inference image") to the image transmission unit 40.

The image transmission unit 40 includes an encoding unit 401 and a decoding unit 402, as illustrated in FIG. 1.

The encoding unit 401 acquires the post-conversion inference image output from the inference image conversion unit 303.

The encoding unit 401 converts the acquired post-conversion inference image to a bitstream using an existing encoding scheme such as H.265/HEVC, for example. The encoding unit 401 transmits the converted bitstream to the decoding unit 402.

The decoding unit 402 receives the bitstream transmitted from the encoding unit 401. The decoding unit 402 decodes the received bitstream using an existing encoding scheme such as H.265/HEVC, for example. Thus, the decoding unit 402 obtains a decoded image. The decoding unit 402 outputs the decoded image to the image correction unit 50.

As described above, in the present embodiment, the post-conversion inference image is output to the encoding unit 401 and is encoded, and the decoding is performed by the decoding unit 402, but the components that perform such encoding and decoding are not essential components. This is because the post-conversion inference image already has a smaller data size than an input inference image even when the post-conversion inference image is not encoded while the post-conversion inference image maintains information necessary for desired image processing and also maintains visual accuracy.

A lossless encoding (reversible encoding) scheme may be used as the encoding scheme used in the encoding unit 401.

As a modification example of the present embodiment, a configuration in which unnecessary information such as several pixels at edges of an image is removed from the post-conversion inference image may be adopted. This is effective in, for example, a case in which an object serving as an image processing target is imaged in a central portion of the image. Thus, because an image having a small original data size can be set as an encoding target image, a target code amount set in the encoding unit 401 can be more easily reached.

The image correction unit 50 acquires the decoded image output from the decoding unit 402. The image correction unit 50 performs a correction process on the acquired decoded image to improve the image processing accuracy. The image correction unit 50 outputs the decoded image subjected to the correction process (hereinafter referred to as a "corrected image") to the image processing unit 60.

The image processing unit 60 acquires the image processing parameter from the image processing parameter storage unit 20. Further, the image processing unit 60 acquires the corrected image output from the image correction unit 50. The image processing unit 60 performs image processing on the acquired corrected image on the basis of the acquired image processing parameter. Thus, the image processing unit 60 obtains the image processing result. The image processing unit 60 outputs information indicating the image processing result to an external device, for example.

Although the training image conversion unit 102 and the inference image conversion unit 303 are separate functional units in the present embodiment, the training image conversion unit 102 and the inference image conversion unit 303 may be configured as one functional unit that operates at the time of learning and the time of inference. Further, similarly, although the training image processing unit 105 and the image processing unit 60 are separate functional units in the present embodiment, the training image processing unit 105 and the image processing unit 60 may be configured as one functional unit that operates at the time of learning and the time of inference.

Hereinafter, an operation of each functional unit will be described. The present embodiment shows a scheme in which learning for the visual accuracy loss is treated as pre-learning of the image smoothing loss and the image processing loss. This scheme is a scheme that can be applied when learning using the visual accuracy loss contributes to improvement in image processing accuracy (for example, when pre-learning is performed with a mean square error (MSE)).

Operation of Learning Unit

Hereinafter, an entire operation of the learning unit 10 will be described.

Figure 2:
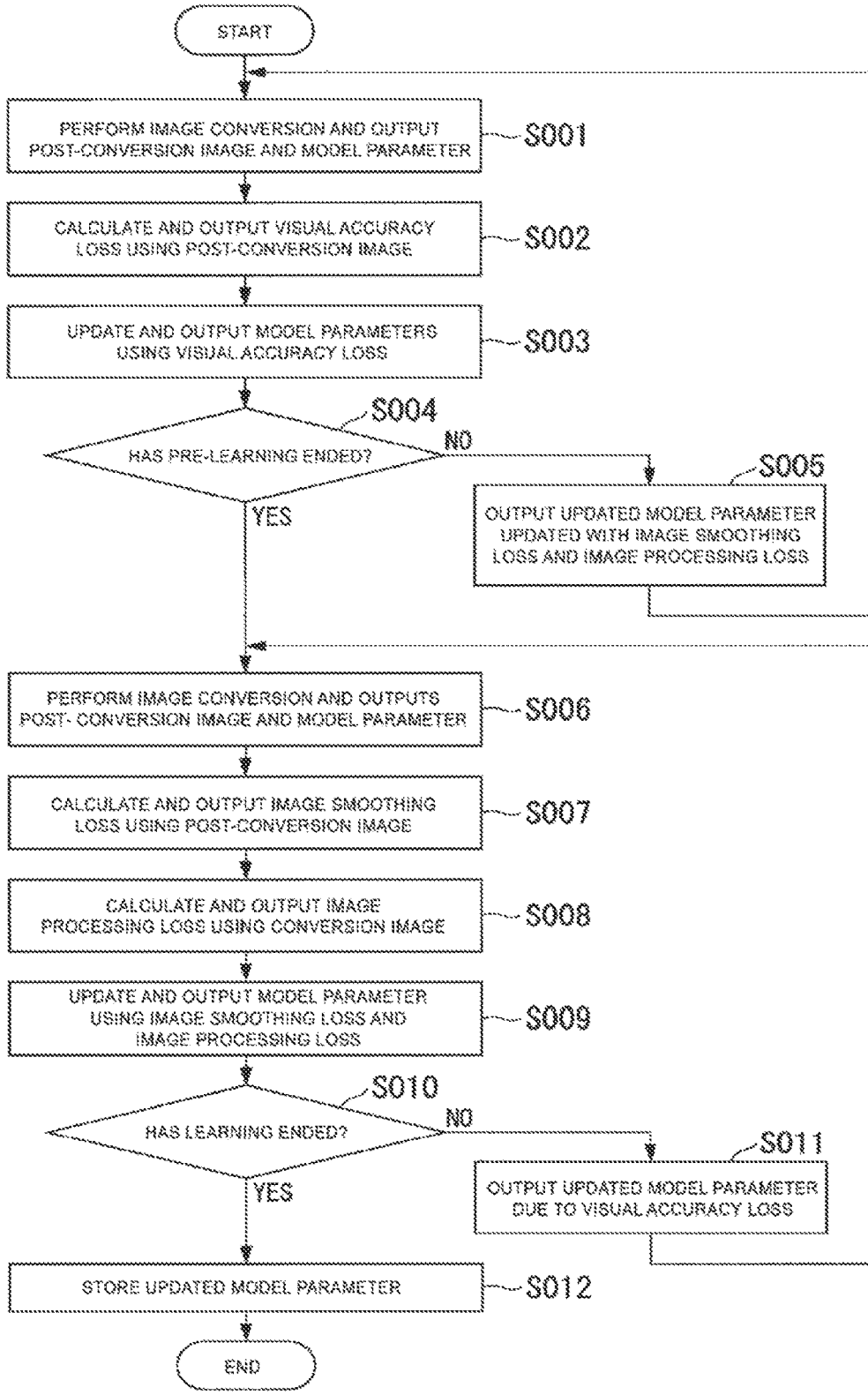
FIG. 2 is a flowchart illustrating an example of an operation of a learning unit 10 according to the first embodiment of the present invention.

FIG. 2 is a flowchart illustrating an example of an operation of the learning unit 10 according to the first embodiment of the present invention.

The training image conversion unit 102 of the learning unit 10 acquires the training image from the training image storage unit 101. Further, the training image conversion unit 102 acquires the updated model parameter from the optimization unit 107. The training image conversion unit 102 performs image conversion on the acquired training image on the basis of the acquired updated model parameter. The training image conversion unit 102 outputs the post-conversion training image to the visual accuracy maintenance unit 103. Further, the training image conversion unit 102 outputs the model parameter to the optimization unit 107 (step S001).

The visual accuracy maintenance unit 103 of the learning unit 10 acquires the post-conversion training image output from the training image conversion unit 102. The visual accuracy maintenance unit 103 evaluates the visual accuracy with respect to the acquired post-conversion training image and calculates the visual accuracy loss for increasing the visual accuracy. The visual accuracy maintenance unit 103 outputs the calculated visual accuracy loss to the optimization unit 107 (step S002).

The optimization unit 107 of the learning unit 10 acquires the visual accuracy loss output from the visual accuracy maintenance unit 103. Further, the optimization unit 107 acquires the model parameter output from the training image conversion unit 102. The optimization unit 107 updates the model parameter on the basis of the acquired visual accuracy loss. The optimization unit 107 outputs the updated model parameter to the training image conversion unit 102 (step S003).

Here, when the pre-learning does not end (step S004: No), the optimization unit 107 outputs the updated model parameter updated on the basis of the image smoothing loss and the image processing loss to the training image conversion unit 102 (step S005). The processes subsequent to step S001 are repeated.

On the other hand, when the pre-learning ends (step S004: Yes), the training image conversion unit 102 performs image conversion on the acquired training image on the basis of the acquired updated model parameter. The training image conversion unit 102 outputs the post-conversion training image to the training image smoothing unit 104 and the training image processing unit 105. Further, the training image conversion unit 102 outputs the model parameter to the optimization unit 107 (step S006).

The training image smoothing unit 104 of the learning unit 10 acquires the post-conversion training image output from the training image conversion unit 102. The training image smoothing unit 104 evaluates the degree of smoothing of the image with respect to the acquired post-conversion training image and calculates the image smoothing loss. The training image smoothing unit 104 outputs the calculated image smoothing loss to the optimization unit 107 (step S007).

The training image processing unit 105 of the learning unit 10 acquires the correct answer label from the training image storage unit 101. Further, the training image processing unit 105 acquires the image processing parameter from the image processing parameter storage unit 20. Further, the training image processing unit 105 acquires the post-conversion training image output from the training image conversion unit 102. The training image processing unit 105 performs image processing on the acquired post-conversion training image to calculate an image processing loss. The training image processing unit 105 outputs the calculated image processing loss to the optimization unit 107 (step S008).

The optimization unit 107 acquires the image smoothing loss output from the training image smoothing unit 104. Further, the optimization unit 107 acquires the image processing loss output from the training image processing unit 105. Further, the optimization unit 107 acquires the model parameter output from the training image conversion unit 102. The optimization unit 107 updates the model parameter on the basis of the acquired image smoothing loss and image processing loss (step S009).

Here, when the learning does not end (step S010: No), the optimization unit 107 outputs the updated model parameter updated on the basis of the visual accuracy loss to the training image conversion unit 102 (step S011). The processes subsequent to step S006 are repeated.

On the other hand, when the learning ends (step S010: Yes), the optimization unit 107 stores the post-learning parameter in the parameter storage unit 301. Thus, the operation of the flowchart of FIG. 2 in the learning unit 10 ends.

Operation of Training Image Conversion Unit Hereinafter, an operation of the training image conversion unit 102 will be described in more detail. The operation of the training image conversion unit 102 to be described below corresponds to the operation of step S001 in FIG. 2 described above.

Figure 3:
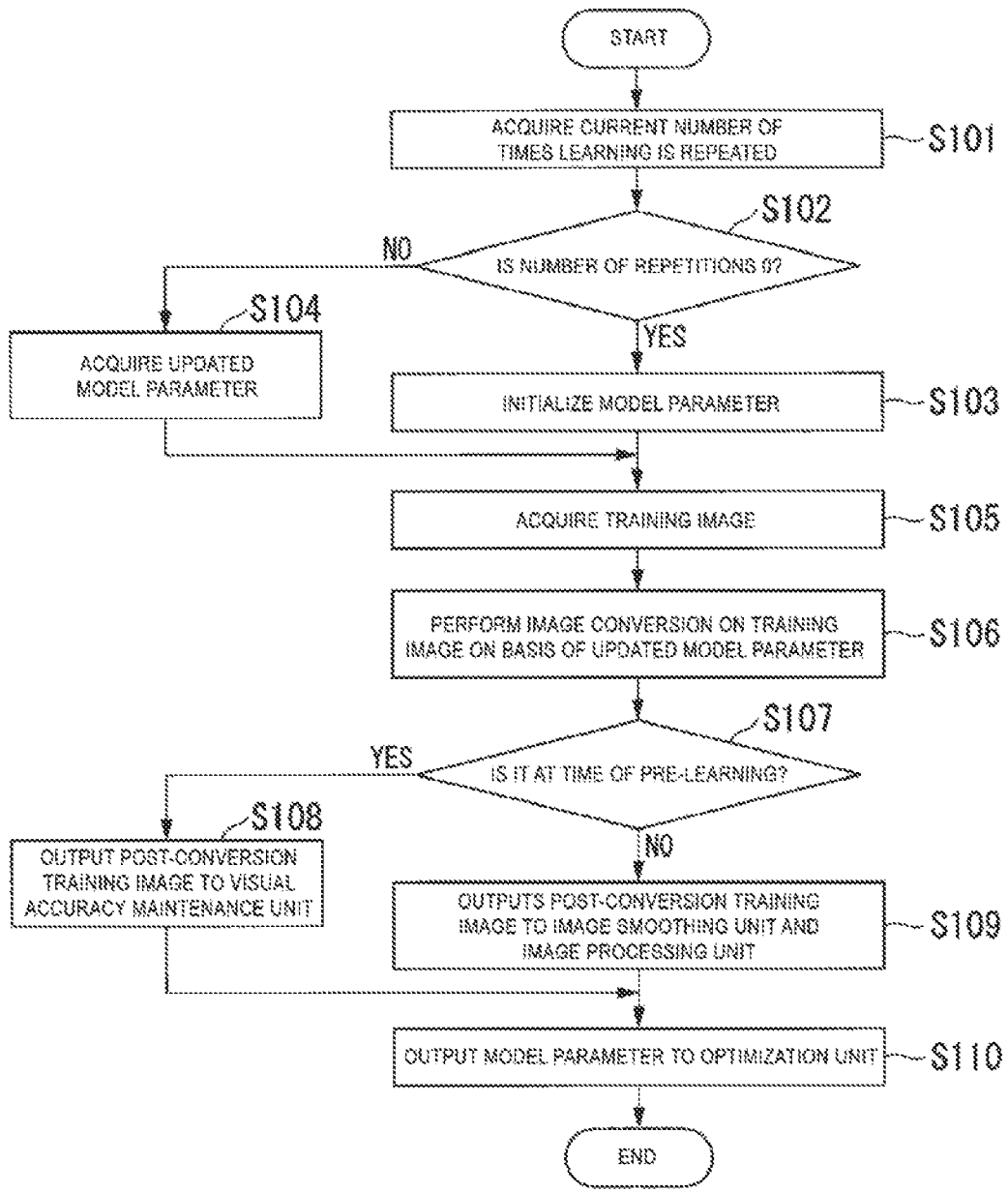
FIG. 3 is a flowchart illustrating an example of an operation of a training image conversion unit 102 according to the first embodiment of the present invention.

FIG. 3 is a flowchart illustrating an example of an operation of the training image conversion unit 102 according to the first embodiment of the present invention.

The training image conversion unit 102 acquires information indicating a current number of times learning has been repeated (that is, the number of times learning has been repeated up to that point) (step S101). It is assumed that the information indicating the current number of times learning has been repeated is stored in, for example, a storage medium included in the learning unit 10.

The training image conversion unit 102 determines whether or not learning has started. That is, the training image conversion unit 102 determines whether or not the number of times learning has been performed based on the acquired information is 0 (step S102). In accordance with a determination that the number of times learning has been performed is 0 (step S102: Yes), the training image conversion unit 102 initializes the model parameter (step S103).

The training image conversion unit 102 may initialize the model parameter with a random value based on a Gaussian distribution, which is generally used. Alternatively, the training image conversion unit 102 may perform fine-tuning using a model parameter of the image conversion model based on learning performed in advance to initialize the model parameter. The term "fine-tuning" used here means setting a parameter obtained by performing learning on the image conversion model using different data sets in advance to an initial value.

On the other hand, in accordance with a determination that the number of times learning has been performed is not 0 (that is, 1 or more) (step S102: No), the training image conversion unit 102 acquires the updated model parameter (that is, the model parameter of the image conversion model that is being learned) from the optimization unit 107 (step S104).

The training image conversion unit 102 acquires the training image from the training image storage unit 101 (step S105). The training image conversion unit 102 performs image conversion on the acquired training image on the basis of the acquired updated model parameter (step S106). Thus, the training image conversion unit 102 obtains the post-conversion training image. Examples of the image conversion used here include non-linear conversion using a neural network.

The training image conversion unit 102 determines whether it is at the time of pre-learning (step S107).

In accordance with a determination that it is at the time of pre-learning (step S107: Yes), the training image conversion unit 102 outputs the post-conversion training image to the visual accuracy maintenance unit 103 (step S108). On the other hand, in accordance with a determination that it is not at the time of pre-learning (that is, the time of learning) (step S107: No), the training image conversion unit 102 outputs the post-conversion training image to the training image smoothing unit 104 and the training image processing unit 195 (step S109).

The training image conversion unit 102 outputs the model parameter used for the above image conversion to the optimization unit 107 (step S110).

Thus, the operation of the flowchart of FIG. 3 in the training image conversion unit 102 ends.

Operation of Visual Accuracy Maintenance Unit Hereinafter, an operation of the visual accuracy maintenance unit 103 will be described in more detail. The operation of the visual accuracy maintenance unit 103 to be described below corresponds to the operation of step S002 in FIG. 2 described above.

Figure 4:
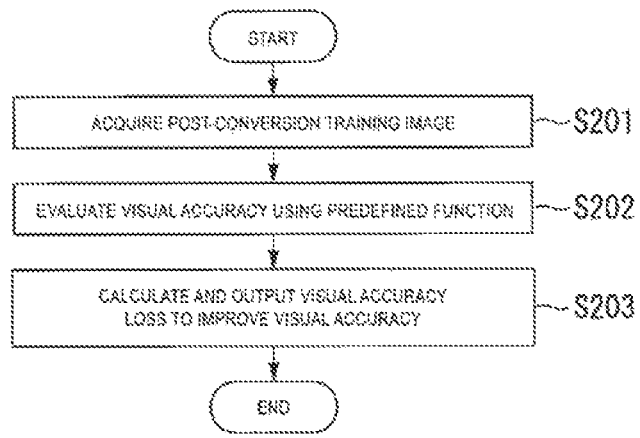
FIG. 4 is a flowchart illustrating an example of an operation of a visual accuracy maintenance unit 103 according to the first embodiment of the present invention.

FIG. 4 is a flowchart illustrating an example of an operation of the visual accuracy maintenance unit 103 according to the first embodiment of the present invention.

The visual accuracy maintenance unit 103 acquires the post-conversion training image (here referred to as a post-conversion training image Y) output from the training image conversion unit 102 (step S201). The visual accuracy maintenance unit 103 evaluates the visual accuracy of the post-conversion training image Y using a predefined function (step S202).

Example of a function for evaluating the visual accuracy include a function for calculating a visual accuracy loss based on a mean square error between the original image and the post-conversion training image Y', a structural similarity (SSIM), or the like. However, the visual accuracy loss may not be based on the mean square error or the SSIM. When the function for evaluating the visual accuracy is an objective function for outputting an image processing result having a correlation with the image processing result when the human performs the image processing through visual inspection, the same effects are obtained.

The visual accuracy maintenance unit 103 calculates a visual accuracy loss (gradient) for increasing the visual accuracy of the human on the basis of the above function for evaluating the visual accuracy. The visual accuracy maintenance unit 103 outputs the calculated visual accuracy loss to the optimization unit 107.

Thus, the operation of the flowchart of FIG. 4 in the visual accuracy maintenance unit 103 ends.

Operation of Training Image Processing Unit Hereinafter, the operation of the training image processing unit 105 will be described in more detail. The operation of the training image processing unit 105 to be described below corresponds to the operation of step S008 in FIG. 2 described above.

Figure 5:
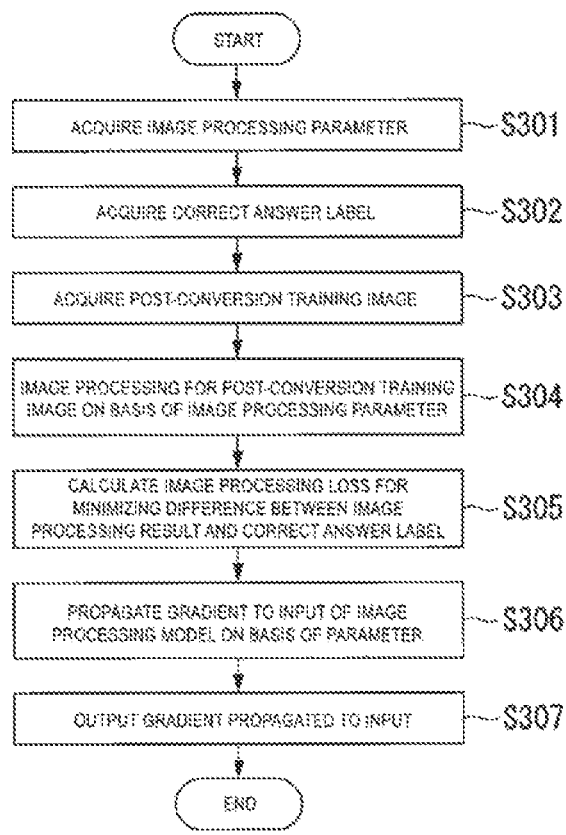
FIG. 5 is a flowchart illustrating an example of an operation of a training image smoothing unit 104 according to the first embodiment of the present invention.

FIG. 5 is a flowchart illustrating an example of an operation of the training image processing unit 105 according to the first embodiment of the present invention.

The training image processing unit 105 acquires the image processing parameter from the image processing parameter storage unit 20 (step S301). The training image processing unit 105 acquires a correct answer label indicating correct answer data in the image processing from the training image storage unit 101 (step S302). The correct answer data is, for example, a vector sequence indicating whether or not each target is imaged in a case in which identification of a subject in an image is performed, and is, for example, an array indicating an area to which each pixel in the image belongs when the image is divided into regions.

The training image processing unit 105 acquires the post-conversion training image Y' output from the training image conversion unit 102 (step S303). The training image processing unit 105 performs image processing on the acquired post-conversion training image Y' on the basis of the acquired image processing parameter (step S304).

Thus, the training image processing unit 105 obtains an image processing result (here, an image processing result x). Examples of the image processing described here include image processing such as object identification using a neural network, object detection, and area division.

The training image processing unit 105 performs image processing on the acquired post-conversion training image Y' to calculate the image processing loss (gradient) for minimization of a difference between the image processing result x and a correct answer label (here, a correct answer label y) (step S305). Cross entropy $L_{cross\_entropy}$ expressed by Equation (1) above, for example, is generally used as the image processing loss.

[Math. 1]

$$L_{cross_{entropy}}(x, y) = -\Sigma y_q \log(x_q) \quad (1)$$

However, the image processing loss is not limited to the cross entropy as described above. When a function for calculating the image processing loss is an appropriate objective function in a desired image processing task, the same effects can be obtained even with, for example, a mean square error.

The calculated image processing loss gives a loss to the image conversion model. Thus, the training image processing unit 105 propagates the gradient (error) to a processing unit corresponding to the input unit of the image processing model (that is, an output unit of the image conversion model). In this case, the model parameter of the image conversion model is not updated.

The training image processing unit 105 outputs the gradient (the image processing loss) propagated to the processing unit corresponding to the input unit of the image processing model to the optimization unit 107.

Thus, the operation of the flowchart of FIG. 5 in the training image processing unit 105 ends.

Operation of Training Image Smoothing Unit Hereinafter, an operation of the training image smoothing unit 104 will be described in more detail. The operation of the training image smoothing unit 104 to be described below corresponds to the operation of step S007 of FIG. 2 described above.

Figure 6:
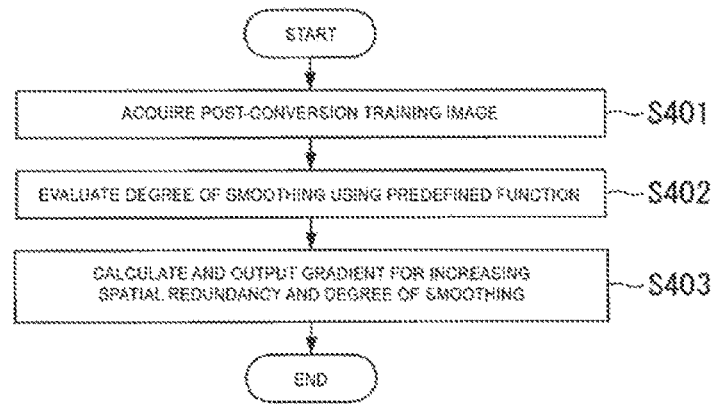
FIG. 6 is a flowchart illustrating an example of an operation of a training image processing unit 105 according to the first embodiment of the present invention.

FIG. 6 is a flowchart illustrating an example of an operation of the training image smoothing unit 104 according to the first embodiment of the present invention.

The training image smoothing unit 104 acquires the post-conversion training image Y' output from the training image conversion unit 102 (step S401). The training image smoothing unit 104 evaluates spatial redundancy and the degree of smoothing of the post-conversion training image using a predefined function (step S402). Examples of a function for evaluating the spatial redundancy and the degree of smoothing may include an image smoothing loss $L_{TV}(Y)$ based on total variation expressed by Equation (2) below.

[Math. 2]

$$L_{TV}(Y) = \Sigma \sqrt{|Y_{i+1,j}' - Y_{i,j}'| + |Y_{i,j+1}' - Y_{i,j}'|} \quad (2)$$

However, the image smoothing loss is not limited to a function based on Total Variation. When a function for calculating the image smoothing loss is an objective function that takes the spatial redundancy into consideration, the same effect is obtained.

The training image smoothing unit 104 calculates a gradient for increasing the spatial redundancy and the degree of smoothing on the basis of the function (for example, Equation (2)) used for the evaluation in step S402. The training image smoothing unit 104 outputs the calculated gradient (the image smoothing loss) to the optimization unit 107 (step S403). Thus, the operation of the flowchart of FIG. 6 in the training image smoothing unit 104 ends.

Operation of Optimization Unit

Hereinafter, an operation of the optimization unit 107 will be described in more detail. The operation of the optimization unit 107 to be described below corresponds to the operations of steps S003 and S009 of FIG. 2 described above.

Figure 7:
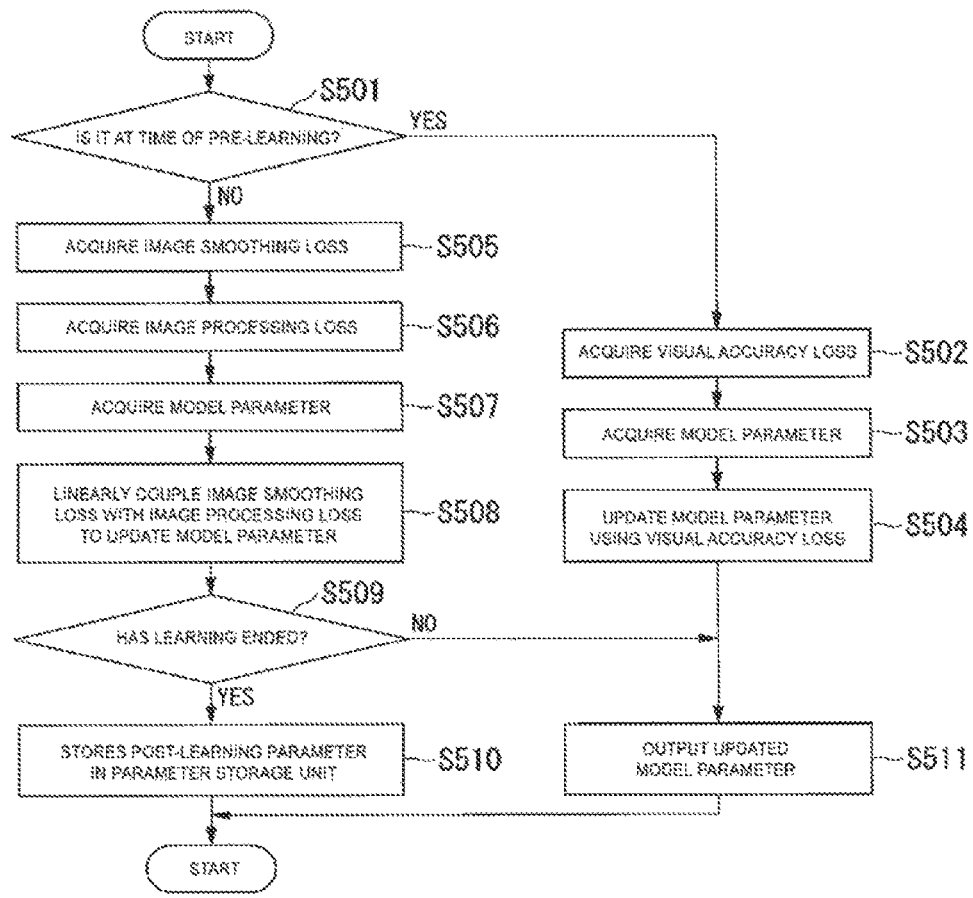
FIG. 7 is a flowchart illustrating an example of an operation of an optimization unit 107 according to the first embodiment of the present invention.

FIG. 7 is a flowchart illustrating an example of an operation of the optimization unit 107 according to the first embodiment of the present invention.

The optimization unit 107 determines whether or not it is the time of pre-learning (step S501). In accordance with a determination that it is at the time of pre-learning (step S501: Yes), the optimization unit 107 acquires the visual accuracy loss output from the visual accuracy maintenance unit 103 (step S502). Further, the optimization unit 107 acquires the model parameter output from the training image conversion unit 102 (step S503). The optimization unit 107 updates the acquired model parameter using the acquired visual accuracy loss (step S504). The optimization unit 107 outputs the updated model parameter to the training image conversion unit 102 (step S511).

On the other hand, in accordance with a determination that it is not at the time of pre-learning (that is, the time of learning) (step S501: Yes), the optimization unit 107 acquires the image smoothing loss output from the training image smoothing unit 104 (step S505). Further, the optimization unit 107 acquires the image processing loss output from the training image processing unit 105 (step S506). Further, the optimization unit 107 acquires the model parameter output from the training image conversion unit 102 (step S507).

The optimization unit 107 linearly couples the image smoothing loss to the image processing loss using a coupling load $\lambda_{cross\_entropy}, \lambda_{TV}$ to update the model parameter (step S508). A ratio for equal evaluation of the image smoothing loss and the image processing loss at about 1:1, for example, can be considered as the coupling load. However, the present invention is not limited to such a predetermined ratio, and the same effects can also be obtained, for example, by performing manual adjustment while viewing a transition of an entire loss function.

In general, for example, stochastic gradient descent (SGD), or Adam that is one of optimization algorithms for gradient descent is used for updating of the model parameter.

However, the present invention is not limited thereto and another optimization algorithm such as a Newton method may be used.

The optimization unit 107 determines whether or not learning has ended in this repetition (step S509). The determination as to whether or not learning has ended may be made on the basis of whether or not a predetermined number of times learning has been performed has been reached or may be made manually on the basis of, for example, a transition of the loss function.

In accordance with a determination that the learning has ended (step S509: Yes), the optimization unit 107 stores the post-learning parameter in the parameter storage unit 301. On the other hand, in accordance with a determination that the learning does not end (step S509: No), the optimization unit 107 outputs the updated model parameter to the training image conversion unit 102 (step S511).

Thus, the operation of the flowchart of FIG. 7 in the optimization unit 107 ends.

Operation of Functional Units Other than Learning Unit

Hereinafter, operations of functional units other than the learning unit 10 (that is, operation subsequent to the inference unit 30 that performs a process in a subsequent stage) will be described.

Figure 8:
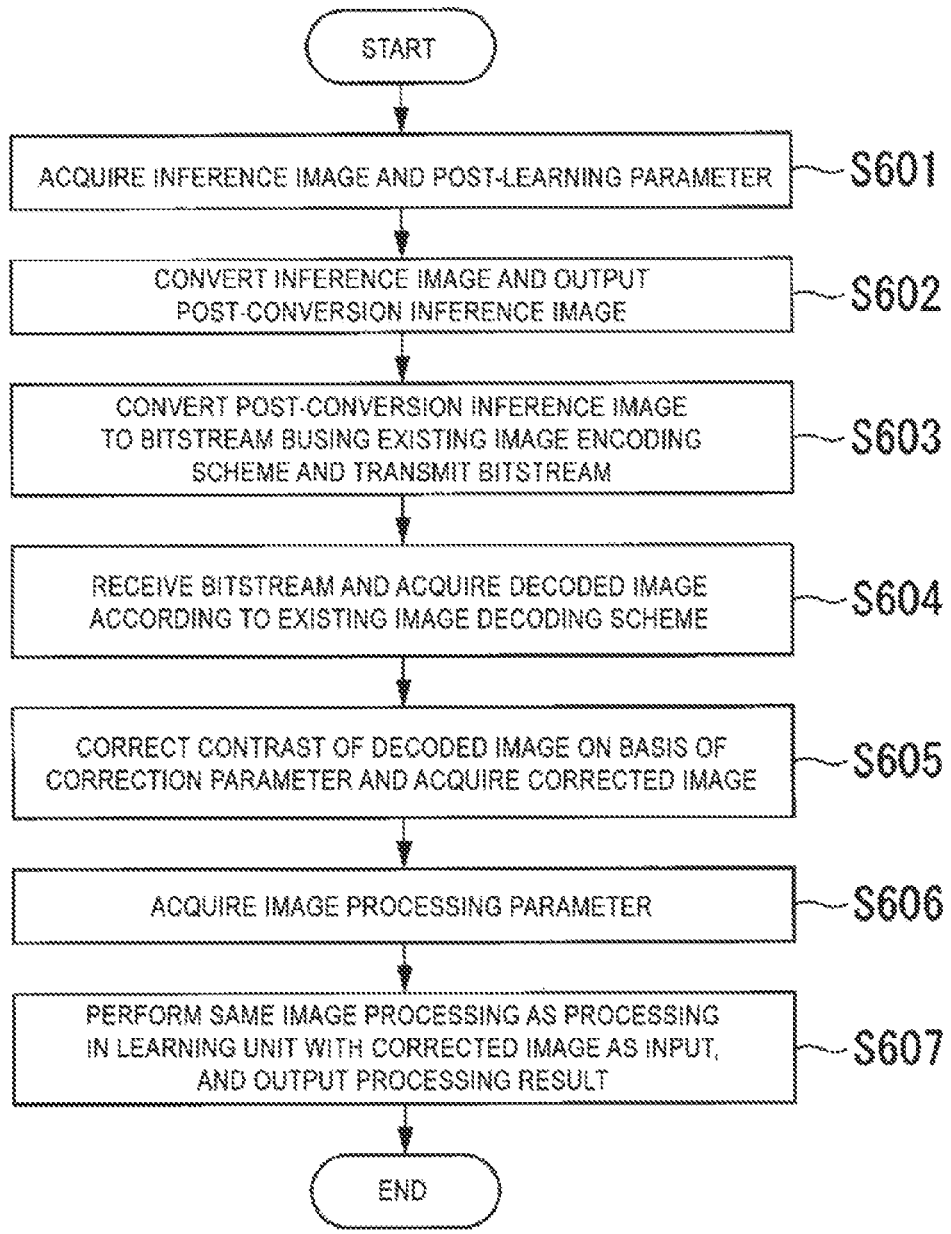
FIG. 8 is a flowchart illustrating operations of functional units other than the learning unit 10 according to the first embodiment of the present invention.

FIG. 8 is a flowchart illustrating operations of the functional unit other than the learning unit 10 according to the first embodiment of the present invention.

The inference image acquisition unit 302 of the inference unit 30 acquires the inference image. The inference image acquisition unit 302 outputs the acquired inference image to the inference image conversion unit 303. The inference image conversion unit 303, to which the inference image has been output, acquires the inference image from the inference image acquisition unit 302. Further, the inference image conversion unit 303 acquires the post-learning parameter from the parameter storage unit 301 (step S601). The inference image conversion unit 303 performs the image conversion on the acquired inference image on the basis of the acquired post-learning parameter. The inference image conversion unit 303 outputs the post-conversion inference image subjected to the image conversion to the image transmission unit 40 (step S602).

The encoding unit 401 of the image transmission unit 40 acquires the post-conversion inference image output from the inference image conversion unit 303. The encoding unit 401 encodes the acquired post-conversion inference image with, for example, an existing encoding scheme such as H.265/HEVC to convert the post-conversion inference image to a bitstream. The encoding unit 401 transmits the converted bitstream to the decoding unit 402 of the image transmission unit 40 (step S603).

The decoding unit 402 receives the bitstream transmitted from the encoding unit 401. The decoding unit 402 decodes the received bitstream using an existing encoding scheme such as H.265/HEVC, for example. Thus, the decoding unit 402 obtains a decoded image (step S604). The decoding unit 402 outputs the decoded image to the image correction unit 50.

The image correction unit 50 acquires the decoded image output from the image correction unit 50. The image correction unit 50 performs, on the acquired decoded image, a correction process for improving the image processing accuracy, such as a process of performing gamma correction on contrast of the decoded image on the basis of a predetermined correction parameter (correction coefficient). Thus, the image correction unit 50 obtains the corrected image (step S605). The image correction unit 50 outputs the corrected image to the image processing unit 60.

The purpose of performing the correction process is to correct a phenomenon that contrast of an image is degraded as a side effect of smoothing at the time of image conversion. However, the present invention is not limited to the correction process for performing gamma correction on the contrast. Even when the correction process is a process such as normalization of a pixel value histogram, the same effects can be obtained. Although a configuration in which contrast correction is performed through the gamma correction with a fixed parameter is assumed here, a configuration in which the correction parameter may be calculated and transmitted for each image may be adopted.

The image processing unit 60 acquires the same image processing parameter as the model parameter of the image processing conversion model used in the learning unit 10 from the image processing parameter storage unit 20 (step S606). Further, the image processing unit 60 acquires the corrected image output from the image correction unit 50. The image processing unit 60 performs image processing on the acquired corrected image on the basis of the acquired image processing parameter. Thus, the image processing unit 60 obtains the image processing result. The image processing unit 60 outputs the information indicating the image processing result to, for example, an external device (step S607).

Thus, the operation of the flowchart of FIG. 8 in the functional units other than the learning unit 10 ends.

Operation of Inference Image Conversion Unit

Figure 9:
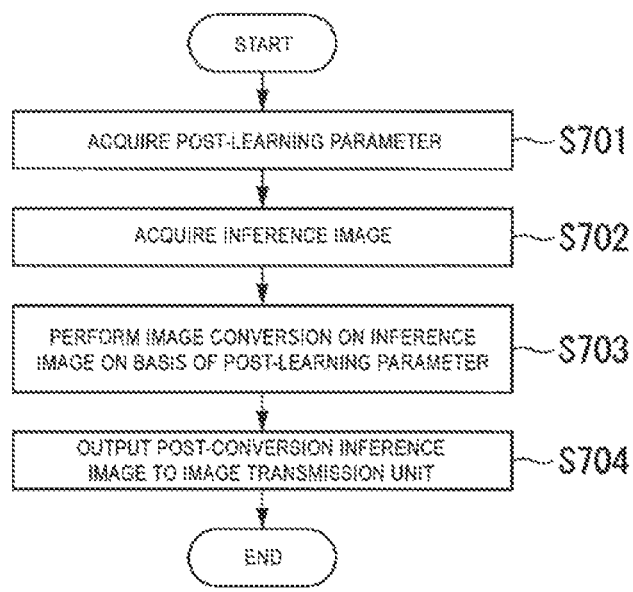
FIG. 9 is a flowchart illustrating an example of an operation of an inference image conversion unit 303 according to the first embodiment of the present invention.

Hereinafter, an operation of the inference image conversion unit 303 will be described in more detail. The operation of the inference image conversion unit 303 to be described below corresponds to the operations of steps S601 and S602 of FIG. 8 described above. FIG. 9 is a flowchart illustrating an example of an operation of the inference image conversion unit 303 according to the first embodiment of the present invention.

The inference image conversion unit 303 acquires the post-learning parameter from the parameter storage unit 301 (step S701). Further, the inference image conversion unit 303 acquires the inference image output from the inference image acquisition unit 302 (step S702). The inference image conversion unit 303 performs the image conversion on the acquired inference image on the basis of the acquired post-learning parameter (step S703). Thus, the inference image conversion unit 303 obtains the post-conversion inference image. Examples of the image conversion used here may include non-linear conversion using a neural network. The inference image conversion unit 303 outputs the post-conversion inference image subjected to the image conversion to the image transmission unit 40 (step S704).

Thus, the operation of the flowchart of FIG. 9 in the inference image conversion unit 303 ends.

Operation of Image Processing Unit

Hereinafter, an operation of the image processing unit 60 will be described in more detail. An operation of the image processing unit 60 to be described below corresponds to the operations of steps S606 and S607 of FIG. 8 described above.

Figure 10:
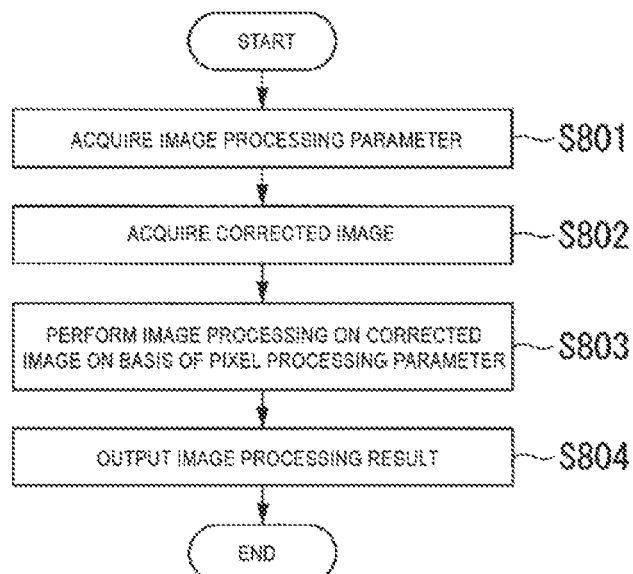
FIG. 10 is a flowchart illustrating an example of an operation of an inference image processing unit 60 according to the first embodiment of the present invention.

FIG. 10 is a flowchart illustrating an example of an operation of the image processing unit 60 according to the first embodiment of the present invention.

The image processing unit 60 acquires the image processing parameter from the image processing parameter storage unit 20 (step S801). Further, the image processing unit 60 acquires the corrected image output from the image correction unit 50 (step S802). The image processing unit 60 performs image processing on the acquired corrected image on the basis of the acquired image processing parameter (step S803). Thus, the image processing unit 60 obtains the image processing result. Examples of the image processing described here include image processing such as object identification using a neural network, object detection, and area division. The image processing unit 60 outputs the information indicating the image processing result to, for example, an external device (step S804).

Thus, the operation of the flowchart of FIG. 10 in the image processing unit 60 ends.

Second Embodiment

Several schemes can be considered for a learning process in the learning unit. These schemes are roughly divided into two schemes including a scheme for performing learning in which a process of the training image processing unit (hereinafter referred to as an "image processing model") is not included in a learning target, and a scheme for performing learning in which the image processing model is included in the learning target The first embodiment described above is an example of the former type of scheme in which the image processing model is not included in the learning target.

On the other hand, in the latter type of scheme in which the image processing model is included in the learning target, the number of parameters to be learned increases as compared with the former type of scheme. Thus, a time required for learning becomes long and the number of pieces of data necessary for convergence of learning increases. However, the latter type of scheme has an advantage that the image processing model can be learned to be suitable for a converted image.

Hereinafter, a second embodiment in which the learning unit performs the learning process using the latter type of scheme will be described with reference to the drawings.

Configuration of Image Processing Device

Figure 11:
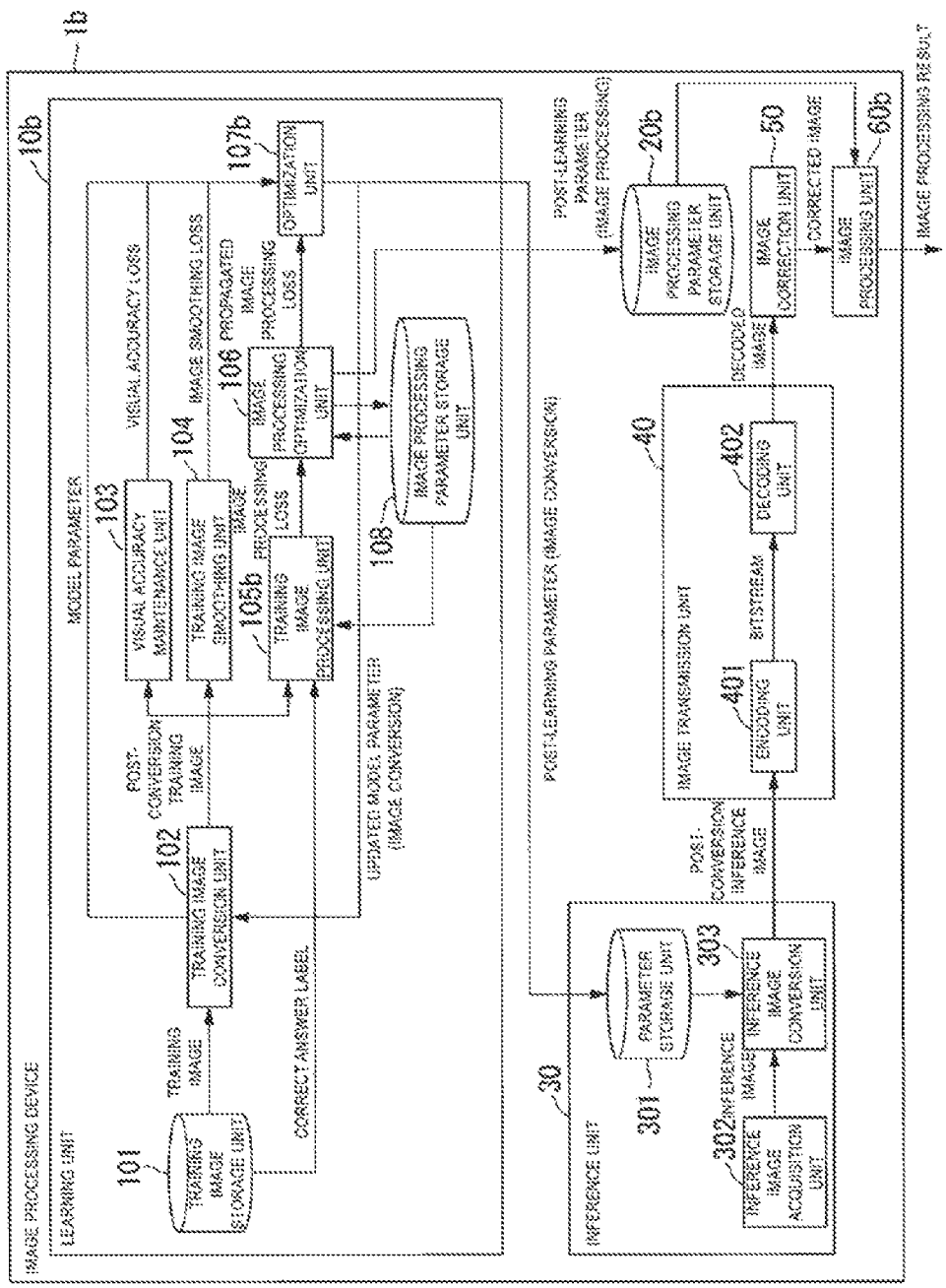
FIG. 11 is a block diagram illustrating a functional configuration of an image processing device 1b according to a second embodiment of the present invention.

Hereinafter, a functional configuration of an image processing device 1b will be described. FIG. 11 is a block diagram illustrating a functional configuration the image processing device 1b according to the second embodiment of the present invention.

The functional configuration of the image processing device 1b according to the second embodiment differs from the functional configuration of the image processing device 1 according to the first embodiment described above in that the image processing device 1b further includes an image processing optimization unit 106 and an image processing parameter storage unit 108, as illustrated in FIG. 11. The image processing optimization unit 106 optimizes the parameter of the image processing model. The optimization unit 107b optimizes the parameter of the image processing model using the propagated image processing loss calculated by the image processing optimization unit 106 and the image smoothing loss. In the following description, functional units having the same functions as those in the first embodiment are denoted by the same reference numerals and description of the functional units will be omitted.

Operation of Training Image Processing Unit

Hereinafter, an operation of the training image processing unit 105 that performs learning including a learning processing model will be described.

Figure 12:
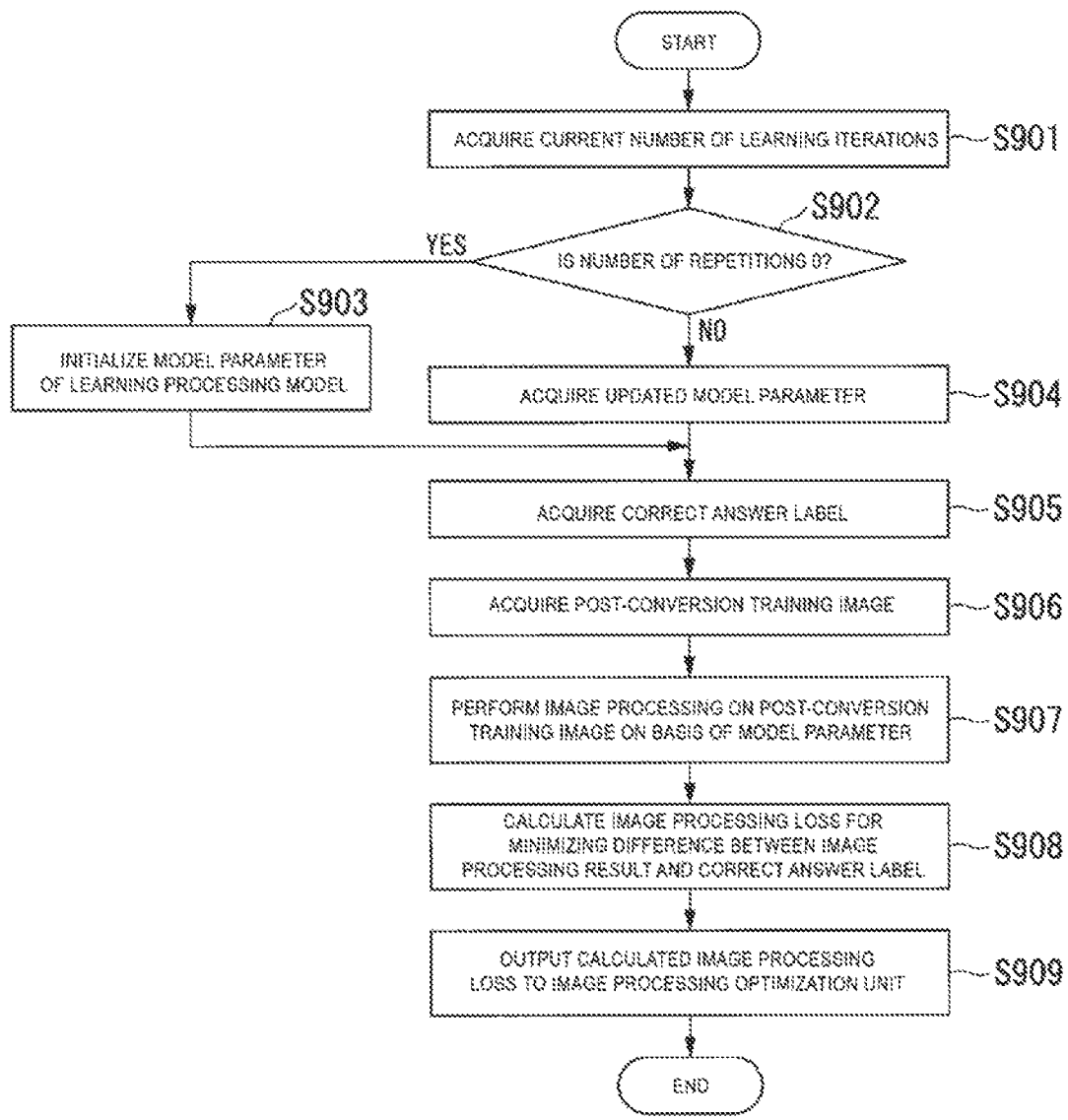
FIG. 12 is a flowchart illustrating an example of an operation of a training image processing unit 105b according to the second embodiment of the present invention.

FIG. 12 is a flowchart illustrating an example of an operation of the training image processing unit 105b according to the second embodiment of the present invention.

The training image processing unit 105b acquires information indicating a current number of times learning has been repeated (that is, the number of times learning has been repeated up to that point) (step S901). It is assumed that the information indicating the current number of times learning has been repeated is stored in, for example, a storage medium included in the learning unit 10b.

The training image processing unit 105b determines whether or not it is at the time of learning start. That is, the training image processing unit 105b determines whether or not the number of times learning has been performed on the basis of the acquired information is 0 (step S902). In accordance with a determination that the number of times learning has been performed is 0 (step S902: Yes), the training image processing unit 105b initializes the parameter of the learning processing model (step S903).

The training image processing unit 105b may initialize the parameter with a random value based on a Gaussian distribution, which is generally used. Alternatively, the training image processing unit 105b may perform fine-tuning using the parameter of the image processing model based on learning performed in advance to initialize the parameter.

On the other hand, in accordance with a determination that the number of times learning has been performed is not 0 (that is, 1 or more) (step S902: No), the training image processing unit 105b acquires the parameter of the learning processing model from the image processing parameter storage unit 108 (step S904).

The training image processing unit 105b acquires the correct answer label indicating correct answer data in the image processing from the training image storage unit 101 (step S905). As described above, the correct answer data is, for example, a vector sequence indicating whether or not each target is imaged in a case in which identification of a subject in an image is performed, and is, for example, an array indicating an area to which each pixel in the image belongs when the image is divided into regions.

The training image processing unit 105b acquires the post-conversion training image (here referred to as a post-conversion training image Y') output from the training image conversion unit 102 (step S906). The training image processing unit 105b performs image processing on the acquired post-conversion training image on the basis of the acquired parameter of the learning processing model (step S907). Thus, the training image processing unit 105b obtains the image processing result (here, the image processing result x).

The training image processing unit 105b performs image processing on the acquired post-conversion training image Y' and calculate an image processing loss (gradient) to minimize the difference between the image processing result x and the correct answer label (here, the correct answer label y) (step S908). Cross entropy $L_{cross\_entropy}$ expressed by Equation (1) above, for example, is generally used as the image processing loss. However, the image processing loss is not limited to the cross entropy as in Equation (1). When the function for calculating the image processing loss is an appropriate objective function in a desired image processing task, the same effects can be obtained even with, for example, a mean square error.

The training image processing unit 105b outputs the calculated image processing loss to the image processing optimization unit 106 (step S909). In this case, the obtained image processing loss is not propagated to an input unit of the learning processing model. Thus, the operation of the flowchart of FIG. 12 in the training image processing unit 105b ends.

Figure 13:
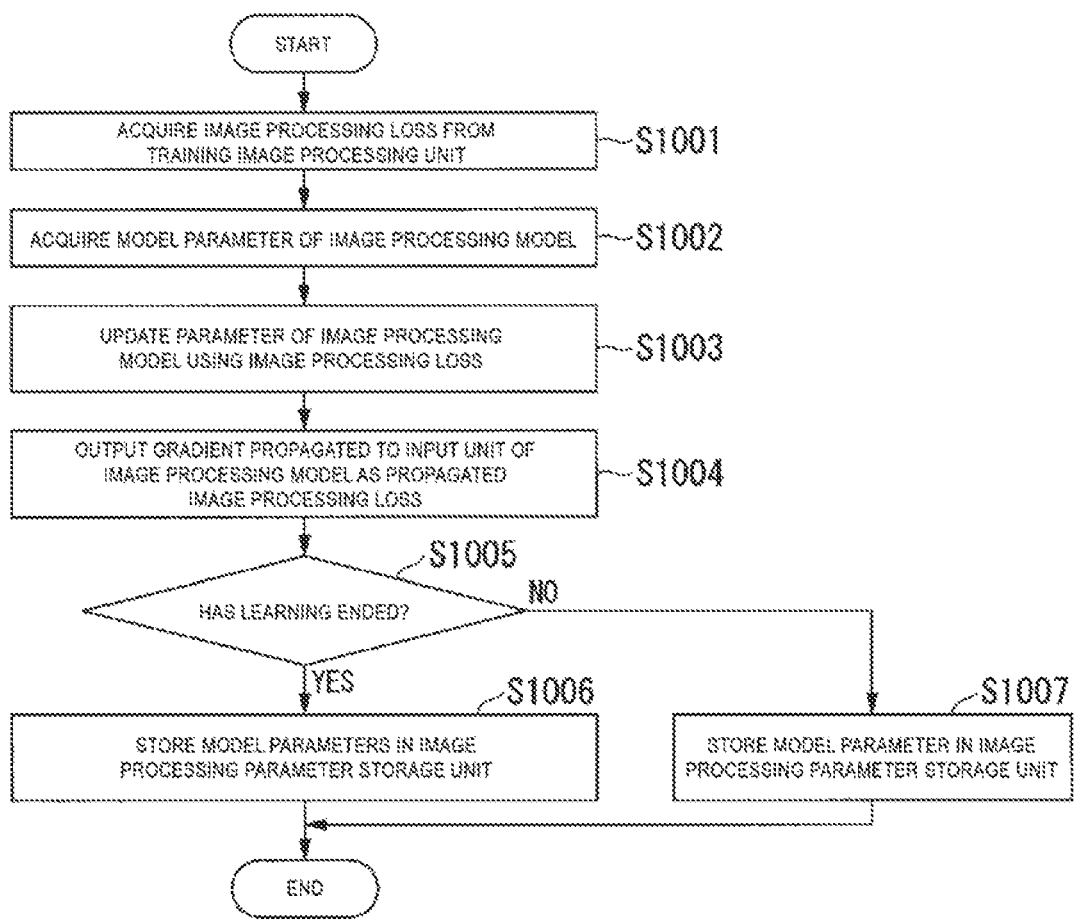
FIG. 13 is a flowchart illustrating an example of an operation of an image processing optimization unit 106 according to the second embodiment of the present invention.

Operation of Image Processing Optimization Unit Hereinafter, an operation of the image processing optimization unit 106 will be described. FIG. 13 is a flowchart illustrating an example of an operation of the image processing optimization unit 106 according to the second embodiment of the present invention.

The image processing optimization unit 106 acquires the image processing loss output from the training image processing unit 105b (step S1001). Further, the image processing optimization unit 106 acquires the parameter of the image processing model from the image processing parameter storage unit 108 (step S1002). The image processing optimization unit 106 updates the acquired parameter of the image processing model using the acquired image processing loss (step S1003).

In general, for example, stochastic gradient descent (SGD), or Adam that is one of optimization algorithms for gradient descent is used for updating of the parameter. However, the present invention is not limited thereto and another optimization algorithm such as a Newton method may be used. A scheme for propagating the gradient to each hierarchy of a neural network by using, for example, an error backpropagation method is used as a gradient calculation scheme in this case.

The image processing optimization unit 106 outputs the gradient propagated to the input unit of the image processing model at the time of updating of the parameter of the image processing model to the optimization unit 107b as a propagated image processing loss (step S1004).

The image processing optimization unit 106 determines whether or not learning has ended in this repetition (step S1005). The determination as to whether or not learning has ended may be made on the basis of whether or not a predetermined number of times learning has been performed has been reached or may be made manually on the basis of, for example, a transition of the loss function.

In accordance with a determination that the learning ends (step S1005: Yes), the image processing optimization unit 106 stores the updated parameter of the learning processing model in an image processing parameter storage unit 20b (step S1006). On the other hand, in accordance with a determination that the learning has not ended (step S1005: No), the image processing optimization unit 106 stores the updated parameter of the learning processing model in the image processing parameter storage unit 108 (step S1007).

Thus, the operation of the flowchart of FIG. 13 in the image processing optimization unit 106 ends.

Processes subsequent to the process of the inference unit 30 in the subsequent stage are the same as the processes in the first embodiment described above. That is, the image processing device 1b performs the image conversion using the inference image conversion unit 303, performs an encoding process and a decoding process according to a general encoding scheme using the image transmission unit 40, and performs image contrast correction in the image correction unit 50. The image processing device 1b performs image processing based on the parameter of the image processing model acquired from the image processing parameter storage unit 20b using the image processing unit 60, and outputs an image processing result.

Third Embodiment

Several methods can be considered for the learning process in the optimization unit included in the learning unit.

For example, the first embodiment shows the scheme in which the learning for the visual accuracy loss is treated as pre-learning of the image smoothing loss and the image processing loss, as described above.

On the other hand, a third embodiment shows a scheme in which the visual accuracy loss, the image smoothing loss, and the image processing loss are all learned at the same time. The latter type of scheme in which all of the three losses are learned at the same time has an advantage that, because all the losses can be learned at the same time, it is possible to further reduce the number of times learning has been repeated, as compared to the former type of scheme. The scheme of the third embodiment to be described below is a scheme that can be applied in a case in which the visual accuracy loss and the image processing loss are contradictory (for example, a case in which the image processing loss increases when the visual accuracy loss decreases). When the visual accuracy loss and the image processing loss are contradictory, the visual accuracy loss and the image processing loss are learned at the same time such that image conversion can be realized to take a trade-off between the visual accuracy loss and the image processing loss.

Hereinafter, the third embodiment in which the optimization unit performs the learning process using the latter type of scheme will be described with reference to the drawings.

Configuration of Image Processing Device

An overall configuration diagram of the image processing device according to the third embodiment is the same as an overall configuration diagram of the image processing device 1 according to the first embodiment illustrated in FIG. 1 or an overall configuration diagram of the image processing device 1 according to the second embodiment illustrated in FIG. 11. However, a process of the optimization unit differs from that of the first and second embodiments.

Operation of Optimization Unit

Hereafter, an operation of the optimization unit according to the third embodiment will be described.

Figure 14:
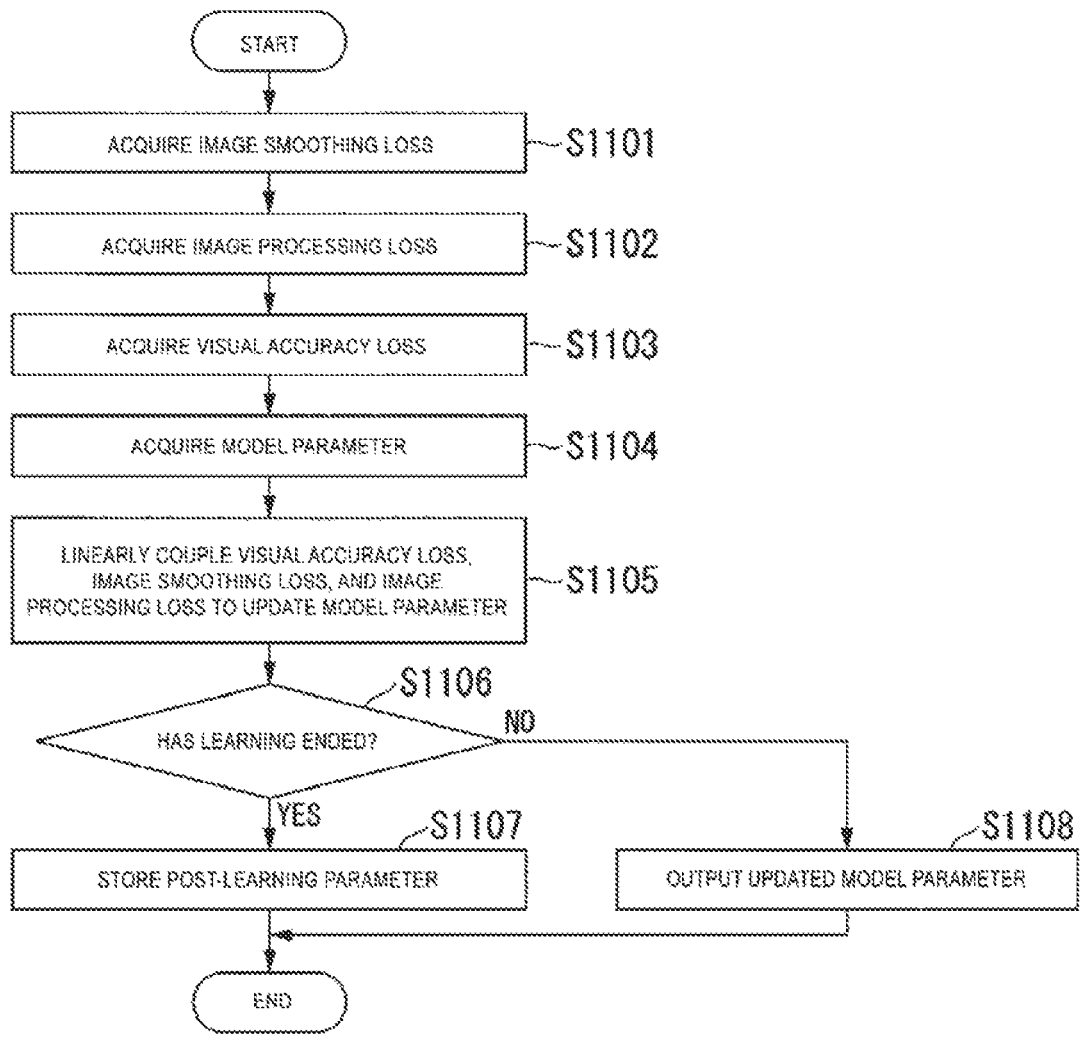
FIG. 14 is a flowchart illustrating an example of an operation of an optimization unit according to a third embodiment of the present invention.

FIG. 14 is a flowchart illustrating an example of an operation of the optimization unit according to the third embodiment of the present invention. A flowchart illustrated in FIG. 14 shows an operation of the optimization unit (hereinafter referred to an "optimization unit 107c") when all of three losses are simultaneously optimized in a configuration of the image processing device 1 according to the first embodiment illustrated in FIG. 1.

The optimization unit 107c acquires the image smoothing loss output from the training image smoothing unit 104 (step S1101). Further, the optimization unit 107c acquires the image processing loss output from the training image processing unit 105 (step S1102). The optimization unit 107c acquires the visual accuracy loss output from the visual accuracy maintenance unit 103 (step S1103). Further, the optimization unit 107c acquires the model parameter output from the training image conversion unit 102 (step S1104).

The optimization unit 107c linearly couples the visual accuracy loss, the image smoothing loss, and the image processing loss using a coupling load $\lambda_{visual} \lambda_{cross\_entropy} \lambda_{TV}$ to update the model parameter (step S1105). A ratio for equal evaluation of all the losses at about 1:1:1, for example, can be considered as the coupling load. However, the present invention is not limited to such a predetermined ratio, and the same effects can be obtained, for example, by performing manual adjustment while viewing a transition of an entire loss function.

In general, for example, stochastic gradient descent (SGD), or Adam that is one of optimization algorithms for gradient descent is used for updating of the model parameter.

However, the present invention is not limited thereto and another optimization algorithm such as a Newton method may be used.

The optimization unit 107c determines whether or not learning has ended in this repetition (step S1106). The determination as to whether or not learning has ended may be made on the basis of whether or not a predetermined number of times learning has been performed has been reached or may be made manually on the basis of, for example, a transition of the loss function.

In accordance with a determination that the learning has ended (step S1106: Yes), the optimization unit 107c stores the post-learning parameter in the parameter storage unit 301 (step S51107). On the other hand, in accordance with a determination that the learning does not end (step S1106: No), the optimization unit 107c outputs the updated model parameter to the training image conversion unit 102 (step S51108).

Thus, the operation of the flowchart of FIG. 14 in the optimization unit 107c ends.

As described above, the image processing device 1 (or the image processing device 1b) according to the embodiment described above includes the image processing unit 60 that executes the image processing on the image (the decoded image) based on the input image (the original image) and outputs the result of the image processing. The input image is an image based on the post-conversion inference image (post-conversion image) obtained by performing the image conversion on the original image. The image conversion further reduces the data size of the original image while maintaining the feature quantity used in the image processing and the processing accuracy of the image processing.

With the image processing device 1 (or the image processing device 1b) according to the embodiment described above having the configuration as described above, it is possible to reduce the code amount when the image is encoded without degrading the image processing accuracy with respect to the image processing such as the object identification, the object detection, the area division without depending on the encoding scheme in the subsequent stage. Further, with the image processing device 1 (or the image processing device 1b) according to the embodiment described above, it is possible to maintain the visual accuracy, which is inspection accuracy when humans have performed the visual inspection. Thus, with the image processing device 1 (or the image processing device 1b), it is possible to perform image transmission with a low code amount. Further, automation of the visual inspection process in which an image processing system is utilized can be industrially applied as a secondary effect.

In the above-described embodiment, the program implemented in the embodiment as described above does not depend on a single device, but may be a program that is recorded on a computer-readable recording medium, loaded into a computer system, and executed. The "computer system" described herein includes an OS or hardware such as a peripheral device. Further, the "computer system" also includes a WWW system including a homepage providing environment (or display environment). Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that holds a program for a certain period of time, such as a volatile memory (RAM) inside a computer system including a server and a client when the program is transmitted over a network such as the Internet or a communication line such as a telephone line.

Further, the program may be transmitted from a computer system in which the program is stored in a storage device or the like to another computer system via a transmission medium or by transmission waves in the transmission medium. Here, the "transmission medium" for transmitting the program refers to a medium having a function of transmitting information such as a network (a communication network) such as the Internet or a communication line such as a telephone line. Further, the program may be a program for realizing some of the above-described functions. Further, the program may be a so-called difference file (difference program) that can realize the above-described functions in combination with a program already recorded in a computer system.

While the embodiments of the present invention have been described above, it is apparent that the embodiments are only examples of the present invention and the present invention is not limited to the embodiments. Thus, additions, omissions, substitutions, and other modifications of the components may be performed without departing from the spirit or scope of the present invention.

REFERENCE SIGNS LIST

1 Image processing device
1b Image processing device
10 Learning unit
10b Learning unit
20 Image processing parameter storage unit
20b Image processing parameter storage unit
30 Inference unit
40 Image transmission unit
50 Image correction unit
60 Image processing unit
101 Training image storage unit
102 Training image conversion unit
103 Visual accuracy maintenance unit
104 Training image smoothing unit
105 Training image processing unit
105b Training image processing unit
106 Image processing optimization unit
107 Optimization unit
107b Optimization unit
108 Image processing parameter storage unit
195 Training image processing unit
301 Parameter storage unit
302 Inference image acquisition unit
303 Inference image conversion unit
401 Encoding unit
402 Decoding unit

The invention claimed is:
1. An image processing device comprising:
a processor; and
a storage medium having computer program instructions stored thereon, when executed by the processor, perform to:
receiving a post-conversion image and a corresponding correct answer label for the post-conversion image, where the post-conversion image was obtained by performing image conversion on an original image;
evaluating spatial redundancy in the post-conversion image using total variation and thereby quantifying image smoothing loss;

calculating a gradient between the post-conversion image and the correct answer label and thereby quantifying image processing loss;

defining a loss function by linearly coupling the image smoothing loss to the image processing loss;

computing an updated model parameter by solving an optimization problem according to the loss function; and performing image conversion on another image according to the updated model parameter.

2. The image processing device according to claim 1, wherein the updated model parameter is updated using gradient descent.

3. The image processing device according to claim 1, wherein the computer program instructions further perform to evaluate visual accuracy of the post-conversion image based on a mean square error between the original image and the post-conversion image.

4. An image processing method comprising:

receiving a post-conversion image and a corresponding correct answer label for the post-conversion image, where the post-conversion image was obtained by performing image conversion on an original image;

evaluating spatial redundancy in the post-conversion image using total variation and thereby quantifying image smoothing loss;

calculating a gradient between the post-conversion image and the correct answer label and thereby quantifying image processing loss;

defining a loss function by linearly coupling the image smoothing loss to the image processing loss;

computing an updated model parameter by solving an optimization problem according to the loss function; and performing image conversion on another image according to the updated model parameter.

5. A non-transitory computer-readable medium having computer-executable instructions that, upon execution of the instructions by a processor of a computer, cause the computer to function as the image processing device according to claim 1.

* * * * *